3,159,009
ABSORPTION REFRIGERATION SYSTEM OF THE INERT GAS TYPE
Wilhelm Georg Kogel, Stockholm, Sweden, assignor to Aktiebolaget Electrolux, Stockholm, Sweden, a corporation of Sweden
Filed Mar. 28, 1963, Ser. No. 268,673
Claims priority, application Sweden Apr. 2, 1962
5 Claims. (Cl. 62—110)

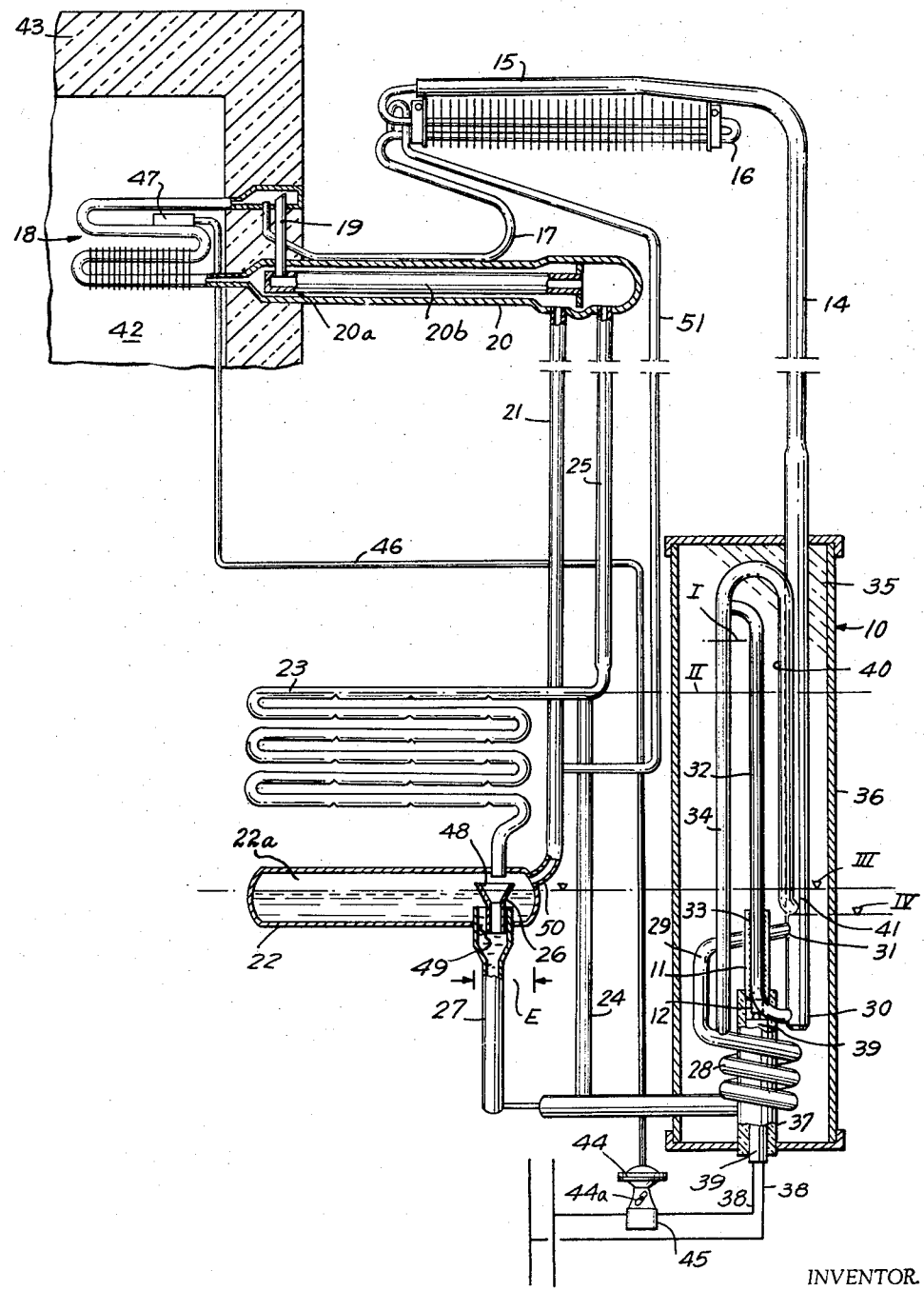

My invention relates to an absorption refrigeration system of the kind containing an inert gas or auxiliary pressure equalizing agent.

In refrigeration systems of this type that are air-cooled, it has been proposed to vary the concentration of refrigerant in the absorption liquid circuit with change in temperature of ambient cooling air by accumulating liquid refrigerant under certain operating conditions and subsequently cause such accumulated refrigerant to be introduced into the absorption liquid circuit under certain other operating conditions. The vessel in which liquid refrigerant is accumulated and withdrawn from the absorption liquid circuit is usually referred to as a "concentration vessel" which, at high ambient air temperature, will be effective to reduce the concentration of refrigerant in the absorption liquid sufficiently for the absorber to function to supply to the cooling unit inert gas sufficiently poor in refrigerant vapor to cause liquid refrigerant to evaporate effectively in the cooling unit or evaporator.

In air-cooled refrigeration systems of this kind, it has also been proposed to connect the "concentration vessel" to the outlet end of the condenser and to the gas circuit, respectively, so that any inert gas that may pass through the condenser can flow into the gas circuit. A vessel connected in the refrigeration system in the manner just described is usually referred to as a "pressure vessel." Refrigerant vapor not liquefied in the condenser due to change in temperature of ambient air normally flows into the "pressure vessel" to displace inert gas therefrom and force it into the gas circuit. The effect of forcing gas into the gas circuit in this manner is that the total pressure in the entire system is raised, whereby an adequate condensing pressure is obtained which insures condensation of refrigerant vapor in the condenser by the ambient cooling air.

In order for the same vessel to function both as a "concentration vessel" and as a "pressure vessel," the concentration of refrigerant in the top surface layer of the body of liquid held in the vessel should be sufficiently great so that refrigerant vapor flowing from the condenser to the vessel will not be absorbed into solution therein and the vessel can function effectively to vary the total pressure in the refrigeration system responsive to change in ambient air temperature. Heretofore, when the same vessel has been employed both as the "concentration vessel" and the "pressure vessel," there has been a tendency for refrigerant vapor flowing from the condenser to the vessel to be absorbed into the top layer of the solution therein, which is objectionable.

It is an object of my invention to provide an improved air-cooled absorption refrigeration system of the inert gas type having a new arrangement and relationship of parts for adjusting the concentration of refrigerant in the absorption liquid circuit and for varying the total pressure in the system with change in ambient air temperature.

Another object of my invention is to provide an improvement of this kind in which the concentration of refrigerant in the top surface layer of a body of liquid employed to adjust the concentration of refrigerant in the absorption liquid circuit is maintained at a high value and substantially prevents absorption into the surface layer of refrigerant vapor flowing from the condenser to the vapor space of a vessel holding such body of liquid, whereby the refrigerant vapor will displace inert gas from the vessel and force it into the gas circuit and can be effectively employed to vary the total pressure in the refrigeration system.

A further object of my invention is to provide an improvement of this kind in which inert gas enriched in refrigerant and normally flowing to the absorber passes through an end zone of an elongated vapor space of the vessel, and, when uncondensed refrigerant vapor flows from the condenser and the normal flow of rich inert gas is reduced, the uncondensed refrigerant vapor is initially introduced into the vapor space at the end zone, so that displacement of the gas mixture from the vapor space in the vessel into the gas circuit will be promoted.

A still further object of my invention is to provide an improved air-cooled absorption refrigeration system of this kind which is of simplified construction.

The above and other objects and advantages of the invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing, in which the single figure illustrates more or less diagrammatically an absorption refrigeration system of the inert gas type embodying the invention.

Referring to the drawing, I have shown my invention embodied in an absorption refrigeration system of a uniform pressure type in which an inert pressure equalizing gas is employed. A refrigeration system of this type comprises a vapor expulsion unit 10 containing a refrigerant, such as ammonia, in solution in a body of absorption liquid, such as water. Heat is supplied to the vapor exulsion unit 10 from a heating tube 11 which may be heated by an electrical heating element 12, for example, which is disposed within the tube.

The heat supplied to the vapor expulsion unit and absorption solution contained therein expels refrigerant vapor out of solution, and, in a manner which will be described hereinafter, the refrigerant vapor passes upward from the vapor expulsion unit 10 through a vapor supply line or conduit 14 and an air-cooled rectifier 15 into an air-cooled condenser 16 in the form of a coil having fins fixed thereto. Refrigerant vapor is liquefied in the condenser 16 by surrounding cooling air which flows over the surfaces of the coil and fins, and the liquefied refrigerant flows through a conduit 17 into a cooling unit 18 in which it evaporates and diffuses into an inert pressure equalizing gas, such as hydrogen, which enters through a conduit 19. Due to evaporation of refrigerant fluid into inert gas in cooling unit 18, a refrigerating effect is produced with consequent absorption of heat from the surroundings.

The rich gas mixture of refrigerant vapor and inert gas formed in cooling unit 18 flows from the lower part thereof through one passage 20a of a gas heat exchanger 20, a conduit 21 and a vessel 22 into the lower end of an air-cooled absorber in the form of a looped coil 23. In absorber coil 23 the rich gas mixture flows counter-current to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage 20b of gas heat exchanger 20 and conduit 19 into the upper part of cooling unit 18. During operation of the refrigeration system, heat is liberated in the absorber 23 due to absorption of refrigerant vapor into absorption liquid. Such heat of absorption is given up to surrounding cool air which passes over the surfaces of the absorber 23, its temperature being determined by the temperature of the cooling air flowing in thermal contact therewith.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber coil 23 is heavier than the gas weak in refrigerant and flowing from the absorber coil 23 to cooling unit 18, a force is produced or developed within the system for causing circulation of inert gas in the manner described.

From conduit section 26, which is disposed within the vessel 22, enriched absorption liquid or absorption solution is conducted through a conduit 27, an inner passage of a liquid heat exchanger 28 and a connection 29 into a vertically extending pipe 30 at a point 31 which is at a level below the liquid surface level of the column of liquid held in the pipe 30. The extreme lower end of pipe 30 is in communication with the lower end of a pump pipe or vapor lift tube 32 in thermal exchange relation with the heating tube 11 at 33, as by welding, for example. Liquid is raised by vapor-liquid lift action through tube or pump pipe 32 into the upper part of a standpipe 34.

The absorption liquid from which refrigerant vapor has been expelled flows from standpipe 34 through the outer passage of liquid heat exchanger 28 and conduit 24 into the upper part of absorber coil 23. The circulation of absorption solution in the liquid circuit just described is effected by raising of liquid through the pump pipe 32 from a low level to a higher level I in standpipe 34. Absorption liquid flows by gravity from level I in vapor expulsion unit 10 and passes from the upper end of conduit 24 into the upper end of the absorber coil 23 at the level II. The quantity of liquid held in standpipe 34 between the levels I and II represents the static pressure head required to overcome the resistance offered to flow of liquid from the standpipe to the upper end of the absorber coil 23.

The vapor expulsion unit 10, together with a part of the liquid heat exchanger 28 are embedded in a body of insulating material 35 retained in a metal shell or casing 36 having an opening at the bottom thereof. The electrical heating element 12 is arranged to be positioned within the heating tube 11 through a hollow sleeve member 37 which is formed of suitable insulating material and extends from the bottom of the heating tube 11 to the bottom opening in the shell 36.

The electrical conductors 38 for the electrical heating element 12 extend through an apertured insulating member 39 held in the hollow sleeve member 37. The heating tube 11 snugly receives the heating element 12 which may comprise a cartridge housing an electric wire or the like having a relatively high resistance that generates heat when connected to a source of electrical energy.

In the operation of the refrigeration system, vapor generated in the vapor lift pipe 32 flows from the upper end thereof through the upper part of standpipe 34 and a conduit 40 to a region 41 in pipe 30 which serves as an analyzer and is disposed below the liquid surface level III of the liquid column contained therein. All of the generated vapor from the conduit 40 passes therefrom at the level IV through the liquid column in the analyzer 41 by bubble action. In bubbling through the enriched solution, absorption liquid vapor accompanying refrigerant vapor is cooled sufficiently and condenses and in this way is removed from refrigerant vapor. Liquid refrigerant conducted from condenser 16 to cooling unit 18 through conduit 17 flows in heat exchange relation with the gas heat exchanger 20. The cooling unit 18 is disposed in a thermally insulated space 42 of a refrigerator cabinet 43.

A control device 44 is operatively associated with a switch 45 connected in one of the conductors 38 for supplying electrical energy to heating element 12. The control device 44 is thermostatically controlled and is provided with a capillary tube 46 and thermal sensitive bulb 47 adapted to contain a suitable volatile fluid, the bulb 47 being arranged in thermal relation with cooling unit 18, for example. The control device 44 functions to control switch 45 responsive to a temperature condition affected by the cooling unit 18 and may be provided with a control knob 44a to adjust the temperature at which it is desired to maintain the cooling unit 18.

The refrigeration system embodies provisions for adjusting the concentration of refrigerant in the absorption liquid circuit by accumulating and storing liquid refrigerant under certain operating conditions, and for subsequently introducing such stored liquid refrigerant into the absorption liquid circuit in a controlled manner. This is accomplished by providing the conduit section 26 within the vessel 23 to form liquid holding spaces adjacent to one another. The conduit section 26 functions as a relatively small absorber vessel, the enlarged upper open end 48 of which forms a liquid inlet to receive absorption liquid from the lower end of the absorber coil 23. The conduit section 26, through which flow of liquid is effected from coil 23 to conduit 27, forms an active portion of the absorption liquid circuit in which the liquid normally circulates during operation of the refrigeration system.

The vessel 22 functions as a concentration vessel in which is stored unevaporated refrigerant passing from the cooling unit or evaporator 18. Such excess or unevaporated refrigerant passes from the lower end of cooling unit 18 and flows along the bottom part of passage 20a of the gas heat exchanger 20 and conduit 21 into the vessel 22, the unevaporated refrigerant entering the vessel 22 through conduit 21 with inert gas enriched in refrigerant. The conduit section 26 is supported in any suitable manner within the upper large end of conduit 27 to provide a passage 49 therebetween. Hence, a region below the liquid surface level of the liquid body in the conduit section 26 is in free liquid communication with a region below the liquid surface of the liquid body in vessel 22, the connecting passage 49 formed by the upper end of the conduit 27 and conduit section 26 being completely filled with liquid under all operating conditions of the system. Free liquid communication is established in such manner between the liquid bodies in the conduit section 26 and vessel 22 that the latter constitutes a part which is disposed outside the active portion of the absorption liquid circuit and in which normal flow of absorption liquid is absent.

It will now be understood that a body of absorption liquid is held in the conduit section 26, and that absorption liquid passes through passage 49 into the vessel 22. Under certain operating conditions, unevaporated refrigerant also passes from the cooling unit 18 into the vessel 22 and accumulates therein. The inert gas enriched in refrigerant flows from the cooling unit 18 through the conduit 21, the lower end of which is in communication with the vapor space of vessel 22. From vessel 22, inert gas enriched in refrigerant flows upward through absorber coil 23 in counterflow to the absorption liquid flowing downward therein.

Since the upper end 48 of the conduit section 26 is positioned so that it will always be at a higher level than the liquid surface at the level III in the vessel 22, the unevaporated liquid refrigerant accumulated in the vessel 22 essentially will be withdrawn from the absorption liquid circuit. Such refrigerant will increase the concentration of refrigerant in the absorption liquid held in vessel 22 to a value materially greater than the concentration of refrigerant in the absorption liquid in the conduit section 26 from which absorption liquid flows through conduit 27.

Stored liquid refrigerant in the vessel 22 is positively introduced into the active portion 27 of the absorption liquid circuit in a controlled manner by redistributing the absorption liquid in its circuit and increasing the quantity of such liquid held in the vessel 22. The quantity of liquid held in vessel 22 is increased when the heat supply to the vapor expulsion unit 10 is reduced to render the vapor lift pump 32 inactive, thereby terminating the raising of absorption liquid to the level I. Under these conditions, normal circulation of liquid in the absorption liquid circuit stops and the quantity of liquid held in standpipe 34 between the levels I and II passes into the upper end of the absorber coil 23 from conduit 24. When the pump 32 becomes inactive, some liquid is, therefore, transferred from vapor expulsion unit 10 to absorber coil 23 and passes to conduit section 26, from which liquid flows from its bottom open end through passage 49 into vessel 22 and collects therein. Also, liquid contained in the absorber coil 23 and wetting its inner wall surfaces will flow downward into the conduit section 26, thereby causing additional liquid to flow from such conduit section into the vessel 22.

Let us assume that an air-cooled refrigeration system like that shown and just described is charged with ammonia, hydrogen and water, so that the system will operate in a satisfactory manner in a normal temperature range of about 68° to 70° F. When the circulation pump 32 in the absorption liquid circuit is in operation, an equilibrium condition is established in which absorption liquid flows at a certain rate into the conduit section 26 and is withdrawn therefrom to the generator 10 at essentially the same rate, and the liquid surface levels in the conduit section 26 and vessel 22 are practically constant. Under these conditions, the liquid column in conduit section 26 balances the liquid column in vessel 22 and passage 49, the gas pressures acting on the liquid surfaces of the liquid bodies in conduit section 26 and vessel 22 being the same.

Active circulation of absorption liquid only takes place through conduit section 26 during normal operation, and the passage 49 and vessel 22 essentially constitute a dead-end appendage for absorption liquid in which the liquid body is more or less stagnant. In such normal operation of the system, the thermostatic control will be operable to shut off the heat supply to the vapor expulsion unit 10 when the cooling unit 18 reaches a predetermined low temperature, and substantially all of the liquid refrigerant will be evaporated therein.

Let us now assume that the ambient air temperature increases upwards to about 95° to 100° F., so that the heat of absorption produced in the absorber coil 23 under the new operating conditions will not be effectively given up to the ambient air flowing in thermal relation therewith. Under such conditions, refrigerant vapor will not be effectively absorbed into absorption liquid in the absorber coil 23, and inert gas will flow to cooling unit 18 having an abnormally high concentration of refrigerant vapor, so that the cooling unit 18 will not be capable of producing the desired low refrigerating temperature for which the thermostatic control is adjusted. Under these assumed conditions, the thermostatic control will function to continue the heat supply to the vapor expulsion unit 10. By reason of the abnormally high partial pressure of refrigerant vapor in the inert gas introduced into the cooling unit 18, all of the liquid refrigerant supplied to the cooling unit will not be evaporated therein, and the excess unevaporated refrigerant passing from the cooling unit 18 will flow to the vessel 22 in which it is accumulated and stored.

By storing unevaporated liquid refrigerant in vessel 22, such refrigerant in effect is withheld or withdrawn from the absorption liquid circuit; and the concentration of refrigerant in the absorption liquid eventually will be reduced adequately, so that absorption liquid having a sufficiently low concentration of refrigerant will be supplied to absorber coil 23 from vapor expulsion unit 10. This will enable the absorber to function properly even at the higher ambient air temperature, thereby enabling the absorber to supply inert gas to cooling unit 18 which will be sufficiently poor in refrigerant vapor to cause substantially all of the liquid refrigerant to evaporate in the cooling unit 18.

When the ambient air temperature decreases from the high value assumed above and begins to approach the normal temperature range, it is highly desirable to increase the concentration of refrigerant in the absorption liquid as soon as possible. This is so because, in the lower or normal temperature range, such increase in concentration of refrigerant in the absorption liquid makes it possible to operate the vapor expulsion unit 10 at a lower temperature, which means that the radiation losses will be reduced, the generator can be operated with less heat input, and the rectification losses will be decreased.

Such decrease in ambient air temperature to the normal temperature range may occur during the nighttime, for example, which in turn reduces the load on the refrigeration system. Under these conditions, the temperature of cooling unit 18 also will decrease; and, when the latter reaches the predetermined low temperature referred to above, the thermostatic control will be operable to shut off the heat supply to the vapor expulsion unit 10. This will interrupt the normal circulation of absorption liquid and cause liquid to be transferred to the conduit section 26 from other parts of the system. By reason of the free liquid communication between the conduit section 26 and the vessel 22, absorption liquid flows from conduit section 26 from its bottom opening and passage 49 into vessel 22 when absorption liquid is transferred to the conduit section 26.

After an interval of time, the temperature of evaporator 18 will rise sufficiently to cause the thermostatic control to function and start the heat supply to the vapor expulsion unit 10, at which time pump 32 becomes active. Liquid will now be withdrawn from vessel 22 by the pump 32, although it should be understood that normal circulation of absorption liquid in this vessel usually is absent. After the pump 32 starts raising liquid into the upper end of standpipe 34, an interval of time will pass before absorption liquid again flows into the conduit section 26. Hence, the entire quantity of liquid held in the vessel 22 will be reduced to an extent corresponding to the accumulation of liquid in the vessel 22 when the normal circulation of absorption liquid is reduced and liquid in the absorption liquid circuit is transferred to the conduit section 26.

When the new pumping period commences, the part of standpipe 34 between the levels I and II is depleted of liquid; and the absorber coil 23 can accumulate a comparatively large amount of liquid at its inner wall surfaces, due to the action of capillary and adhesive forces, before a stream of liquid passes through the entire length of the absorber coil. In view of the manner in which normal circulation of absorption liquid is resumed, a certain amount of absorption liquid relatively rich in refrigerant will pass from the upper part of vessel 22 into the active portion of the absorption liquid circuit when pumping is started following a shut-down period. When absorption liquid again flows into conduit section 26 from coil 23 and an equilibrium condition is established, the liquid levels in the conduit section 26 and the vessel 22 will be essentially the same due to the free liquid communication therebetween and the same gaseous atmosphere enveloping the liquid bodies in both vessels.

The lower end of conduit 21, through which inert gas enriched in refrigerant flows downward from cooling unit 18, is connected to the upper part of vessel 22 at one end thereof at a region 50 which is closely adjacent to and at the immediate vicinity of the lower end of the absorber coil 23. The region 50 at which conduit 21 is connected to vessel 22 is offset laterally from the inlet opening 48 of the conduit section 26 so that unevaporated refrigerant flowing from the cooling unit 18 to the vessel 22 under certain operating conditions will collect in the body of absorption liquid formed about the conduit section 26.

By arranging the lower open ends of the absorber coil 23 and conduit 21 closely adjacent to one another, inert gas enriched in refrigerant flows downward in conduit 21 and for all practical purposes immediately reverses its direction of flow and enters the lower open end of absorber coil 23 for upward flow in the latter in the presence of downwardly flowing absorption liquid in which refrigerant is absorbed into solution. With this arrangement, the gas mixture in the vapor space 22a is practically undisturbed and active circulation of the gas mixture in the space 22a is substantially avoided.

By having the lower end of absorber coil 23 and conduit 21 as near together as practically possible, the rich inert gas flows more or less directly from conduit 21 into the lower open end of absorber coil 23 and the vapor space 22a essentially forms a dead-end pocket for the gas mixture in the vapor space 22a, the dead-end pocket being in communication with the inert gas circuit and for all practical purposes forming an inactive part thereof in which active circulation of gas is substantially avoided.

In absorber coil 23 refrigerant is absorbed from the rich gas mixture into downwardly flowing absorption liquid which is discharged from its lower end and normally flows through the conduit section 26 and conduit 27 to the lift pump 32. While enriched absorption liquid flowing through conduit section 26 is in physical contact with absorption liquid in the bottom part of passage 49, such physical contact is negligible and will not disturb the body of liquid in vessel 22 which is disposed outside the active portion of the absorption liquid circuit and in which normal flow of absorption liquid is absent. With this arrangement, the concentration of refrigerant in the top surface layer of liquid in the vessel 22 will increase to a value materially greater than the concentration of refrigerant in the absorption liquid passing from the lower end of absorber coil 23 and flowing to the lift pump 32 through the conduit section 26 and conduit 27.

It has been proposed heretofore to connect the vessel 22 to the outlet end of the condenser 16, so that refrigerant vapor not liquefied in the condenser due to change in temperature of ambient air flows into the vessel, whereby the latter can function as a "pressure vessel." In such case, the volume of the vapor space 22a in vessel 22 desirably is related to the remainder of the volume of the inert gas circuit in such a manner that the essentially stagnant vapor blanket overlying the liquid body in vessel 22, having a relatively high partial pressure of refrigerant vapor, can be effectively employed to vary the total pressure in the refrigeration system responsive to change in ambient air temperature. However, when the vessel 22 has been employed heretofore both as the "concentration vessel" and "pressure vessel," there has been a tendency for refrigerant vapor flowing from the condenser to the vessel 22 to be absorbed into the top surface layer of liquid therein, thereby reducing its effectiveness as a "pressure vessel."

In accordance with my invention, in order to substantially prevent the absorption of refrigerant vapor into the top surface layer of liquid in the vessel 22 so that its ability to function as a "pressure vessel" will not be impaired, the lower ends of the absorber coil 23 and conduit 21 and the upper end of conduit 27 are connected to the elongated horizontally disposed vessel 22 along an end zone E thereof which does not exceed one-half of and preferably is less than one-third of its length. Further, refrigerant vapor not liquefied in the condenser 16 is initially introduced into the vapor space 22a of the vessel 22 at the end zone E and replaces enriched inert gas normally passing through the end zone E from the lower end of the conduit 21 to the lower end of the absorber coil 23, so that displacement of the gas mixture from the vapor space 22a to the gas circuit will be promoted.

By connecting the conduit 21 and the lower end of the absorber coil 23 to the vessel 22 at regions closely adjacent to one another at the end zone E, the concentration of refrigerant in the top liquid surface layer, which is formed in vessel 22 by conducting unevaporated refrigerant from cooling unit 18 to vessel 22 under certain operating conditions, as explained above, is relatively high and approaches the concentration of substantially pure refrigerant.

By virtue of the fact that the concentration of refrigerant in the top surface layer of liquid in the vessel 22 is relatively high and approaches the concentration of substantially pure refrigerant, the gas mixture in the space 22a also will have a relatively high partial pressure of refrigerant vapor corresponding to the high concentration of refrigerant in the top surface layer of the absorption liquid. In other words, a state of equilibrium between liquid refrigerant and its vapor will be reached and maintained in vessel 22 as the concentration of refrigerant in the top surface layer of liquid becomes greater due to flow of unevaporated refrigerant into the vessel through conduit 21.

In the preferred embodiment illustrated and being described, a vent conduit 51 is connected to the outlet end of the condenser 16 and to the conduit 21 for conducting to the vessel 22 refrigerant vapor not liquefied in the condenser. The refrigerant vapor flows downward in conduit 21 and is initially introduced into the vapor space 22a of vessel 22 at the same end region that inert gas enriched in refrigerant passes from the lower end of conduit 21 into the vapor space 22a. In order not to impair the heat exchange effected between weak inert gas flowing in gas heat exchanger passage 20b and rich inert gas flowing in gas heat exchanger passage 20a when circulation of inert gas is being effected in the inert gas circuit, the vent conduit 51 is connected to the conduit 21 between the gas heat exchanger 20 and the vessel 22.

Refrigerant vapor not liquefied in the condenser 16 flows therefrom when the ambient air temperature rises and the condensing pressure is inadequate for the ambient air at the higher temperature. When this occurs the normal circulation of inert gas in the gas circuit is reduced and refrigerant vapor introduced into the end zone E of the vessel 22 through conduit 21 under these conditions replaces enriched inert gas normally passing from the lower end of the conduit 21 to the lower end of the absorber coil 23. Since the specific gravity of a refrigerant vapor like ammonia is greater than that of a gas mixture of ammonia and an inert gas like hydrogen, for example, the refrigerant vapor introduced into the gas space 22a of vessel 22 descends and accumulates over the top liquid surface layer in the vessel. Since the concentration of refrigerant in the top liquid surface layer is relatively high and approaches the concentration of substantially pure refrigerant, only a negligible quantity of refrigerant vapor will be absorbed into solution at the top liquid surface layer. In this manner, a gaseous blanket of substantially pure refrigerant vapor builds up over the top liquid surface layer in the gas space 22a when refrigerant vapor flows therein through the conduit 21, the gaseous blanket becoming progressively thicker and effectively functioning to displace the gas mixture already in the gas space 22a and force such gas mixture into the gas circuit to increase the total pressure in the entire refrigeration system.

In view of the foregoing, it will now be understood that conduit 21 forms a part of the inert gas circuit through which rich inert gas normally flows from the cooling unit 18 to the lower end of the absorber coil. Also, unevaporated liquid refrigerant passing from the cooling unit 18 is conducted to the vessel 22 in a path of flow which includes gas heat exchanger passage 20a and the conduit 21. Further, the conduit 21 is employed to conduct refrigerant vapor from the outlet end of the condenser 16 to the vessel 22. It will now be understood that inert gas is introduced into and withdrawn from the space 22a at the end zone E and uncondensed refrigerant flows from the condenser 16 to the space 22a at the end zone E, whereby the vapor space 22a in the remaining major part of the elongated vessel 22 forms a dead-end pocket for inert gas. Hence, a new arrangement and relationship of parts for adjusting the concentration of refrigerant in the absorption liquid circuit and for varying the total pressure in the system with change in ambient air temperature has been provided, which is of simplified construction.

Modifications of the embodiment of the invention which I have described and illustrated will occur to those skilled in the art, so that I do not desire to be limited to the particular arrangement set forth. Therefore, I intend in the claims to cover all those modifications and features which do not depart from the spirit and scope of my invention.

I claim:

1. In the art of refrigeration in which refrigerant vapor is expelled from absorption liquid in a generator, refrigerant vapor is condensed to liquid in a condenser cooled by ambient air, liquid refrigerant evaporates in an evaporator in the presence of an inert gas, refrigerant vapor is absorbed from inert gas by absorption liquid in an absorber cooled by ambient air, inert gas is circulated in a circuit between the evaporator and absorber, absorption liquid is circulated between the generator and the absorber which has an inlet at one level and an outlet at a lower level, and a body of absorption liquid is held in an elongated horizontally extending first place, the body of absorption liquid at the first place having a region below its surface in communication with a region below the surface of a liquid body in a second place which receive absorption liquid discharged from the absorber outlet, the improvement which comprises the steps of flowing unevaporated liquid refrigerant from the evaporator to an end zone of the elongated first place in a path of flow which terminates in a vapor space above the liquid surface therein, introducing inert gas from the evaporator into the vapor space at the end zone and withdrawing inert gas from the vapor space at the end zone for upward flow through the absorber, and flowing uncondensed refrigerant vapor from the outlet end of the condenser to the vapor space at the end zone with increase in ambient air temperature.

2. The improvement set forth in claim 1 in which a portion of the path of flow for inert gas from the evaporator to the vapor space at the end zone of the first place and terminating at the end zone also serves for at least a part of the path of flow for unevaporated liquid refrigerant flowing from the evaporator to the end zone of the first place and for uncondensed refrigerant flowing from the outlet of the condenser to the end zone of the first place.

3. The combination with an hermetically closed absorption refrigeration system containing refrigerant, inert gas and absorption liquid, said system comprising circuits for circulation of the aforementioned fluids, the circuit for refrigerant including a condenser adapted to be cooled by ambient air and an evaporator, the circuit for inert gas including said evaporator and an absorber adapted to be cooled by ambient air, the circuit for circulation of absorption liquid comprising a generator and said absorber and means providing a first place disposed between said absorber and said generator for holding a body of absorption liquid having a vapor space above the liquid body, means providing an elongated horizontally extending second place for holding a body of absorption liquid having a vapor space above such liquid body in communication with the vapor space above the liquid body in said first space, and means establishing free liquid communication between said first and second places beneath the liquid surfaces of the bodies of absorption liquid therein, of means for conducting unevaporated refrigerant from said evaporator to a region of the vapor space of said second place, said circuit for inert gas including means for flowing inert gas from said evaporator to a region of the vapor space of said second place and for withdrawing inert gas from a region of the vapor space of said second place for upward flow through said absorber, means for conducting uncondensed refrigerant vapor from the outlet end of said condenser to a region of the vapor space of said second place responsive to increase in ambient air temperature, and the region at which unevaporated refrigerant is conducted to the vapor space of said second space and the regions at which inert gas flows to and is withdrawn from the vapor space of said second place and the regions at which uncondensed refrigerant is conducted to the vapor space of said second place all being disposed at an end zone of said elongated second place which is less than one-half of the length thereof.

4. The combination set forth in claim 3 in which said end zone is less than one-third of the length of said elongated second place.

5. The combination set forth in claim 3 in which said means for flowing inert gas from said evaporator includes a conduit having one end connected to the vapor space of said second place, and said conduit forming part of said means for conducting unevaporated refrigerant from said evaporator to the vapor space of said second place and a part of said means for conducting uncondensed refrigerant vapor from the outlet end of said condenser to the vapor space of said second place.

References Cited in the file of this patent

UNITED STATES PATENTS

| 2,842,943 | Kogel et al. | July 15, 1958 |
| 3,020,725 | Kogel | Feb. 13, 1962 |